UNITED STATES PATENT OFFICE.

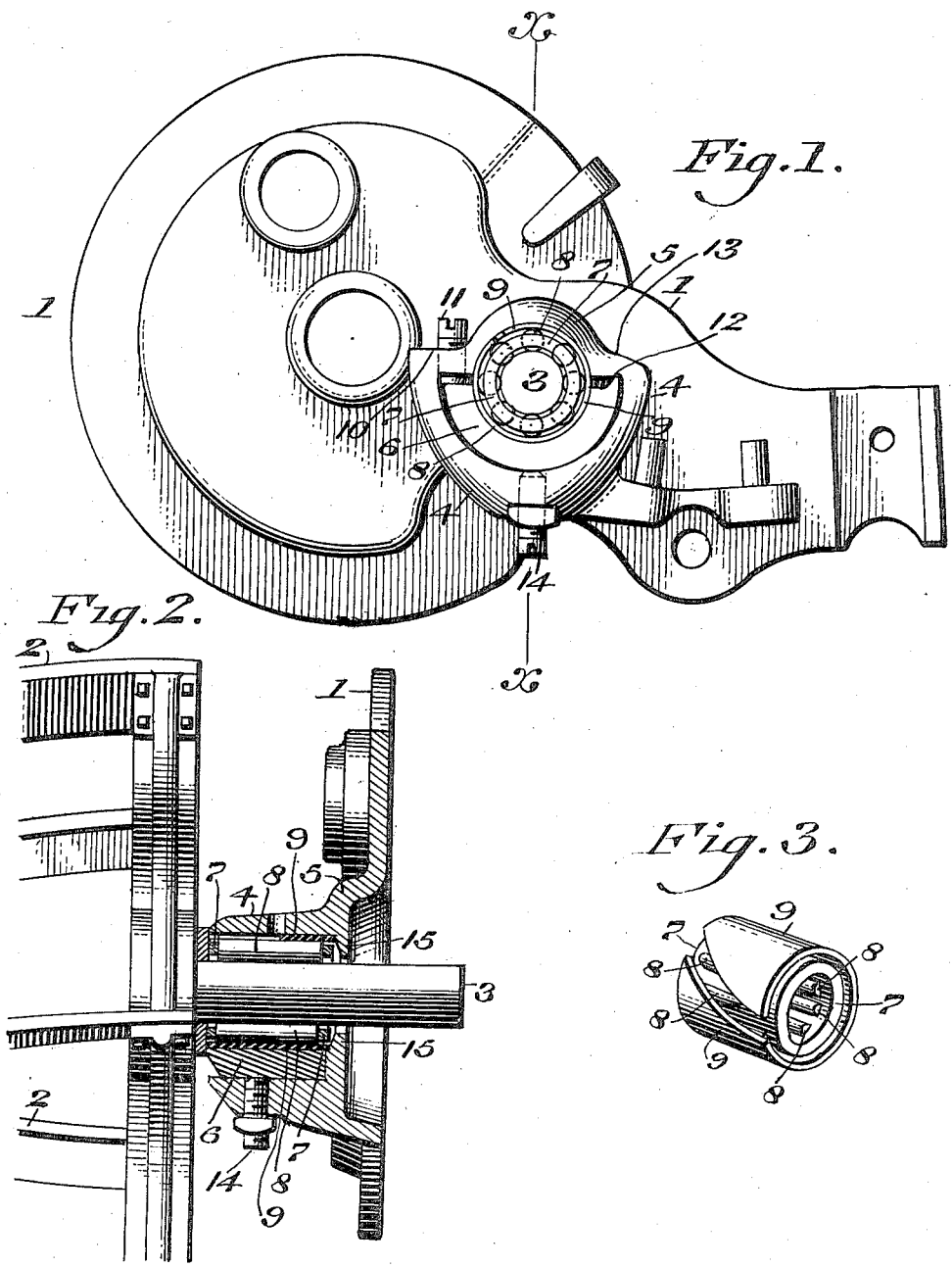

WALTER E. GRAHAM, OF PHILADELPHIA, PENNSYLVANIA.

ROLLER-BEARING.

1,160,594.  Specification of Letters Patent.  Patented Nov. 16, 1915.

Application filed February 13, 1915. Serial No. 7,971.

*To all whom it may concern:*

Be it known that I, WALTER E. GRAHAM, a citizen of the United States, residing in the city and county of Philadelphia, State of Pennsylvania, have invented a new and useful Roller-Bearing, of which the following is a specification.

My invention consists of a roller-bearing, more particularly for the journal or shaft of a lawn mower, said bearing being composed of cylindrical shaped rollers, and mounted in cylindrical shaped pockets, so that the rollers are parallel with said journal, causing the latter and consequently the cutting cylinder to revolve with uniformity and absolutely true in circular direction, avoiding furthermore, the grooving or creasing of the roller, provision also being made for taking up the wear of the journal or shaft and said rollers.

It consists also of details of construction as will be hereinafter set forth.

The invention is satisfactorily illustrated in the accompanying drawing, but the important instrumentalities thereof may be varied, as long as they are included in the scope of the claim.

Figure 1 represents an elevation of the side plate of a lawn mower, and the features of my invention applied thereto. Fig. 2 represents a transverse vertical section thereof on the line $x$—$x$ Fig. 1. Fig. 3 represents a perspective view of a detached portion thereof.

Similar numerals of reference indicate corresponding parts in the figures.

Referring to the drawings, 1 designates a side plate of a lawn mower, 2 the cutter cylinder, and 3 one of the journals of the latter, all of usual construction. Projecting from the inner face of said plate is the boss 4, which is cast or otherwise made integral with the plate, the upper portion 5 of said boss being comparatively of semi-cylindrical form. Fitted within said boss below said portion 5 thereof is the semi-cylindrical or segmental band 6, which with the portion 5 of the boss forms a cylindrical shaped bearing for the journal 3, it being seen that by the above construction, said bearing is split or divided. Within said bearing is the cage 7, which is of cylindrical form and has mounted in pockets in its wall the cylindrical shaped rollers 8, which extend in the direction of the length of said cage, and whose peripheries are partly within the inner periphery of said cage, and partly without the outer periphery thereof, it being noticed that the journal 3 is within said cage 7, and contacts with the rollers 8, which encircle it within said cage.

Within the bearings 6, 5, is the sleeve or tubular washer 9, which is split or divided in its periphery and thereby made resilient and so expansible and contractible, it encircling the cage 7, and having bearing against it the portions of the rollers that project from said cage on the exterior thereof.

Fitted in the offset 10 on a side of the upper portion 5 of the boss 1, is the set screw or bolt 11, which extends downwardly therethrough, and has its point engaging the upper adjacent end of the loose band 6, the other end of which latter is formed with an upwardly projecting shoulder or tongue 12 which is freely fulcrumed in a recess in the inner side of the offset 13 on the portion 5 of the boss opposite to the offset 10, forming with said offset a knuckle-joint for the adjacent end of said band, so that said tongue 12 of the band may remain in and turn on the wall of said recess in its adjusting and tightening motions on the rollers 8.

Fitted in the bottom of the boss is the screw or bolt 14, which extends upwardly therethrough and has its point engaging the adjacent central bottom portion of the periphery of said loose band 6, being the tightening and adjusting device for said band by which provision said band may be properly set in the boss to impart the required tension to the sleeve 9 and properly adjust the rollers 8 around the journal and so keep them centered with the latter, while providing means for taking up the wear of the contacting parts.

On the terminal of the opening or bore of the boss 4 next to the plate 1 is the flange 15 which is of less diameter than said bore, so that the adjacent end of the cage may abut the same and so limit the inward thrust of said cage in said bore and prevent lateral play and wabbling thereof.

Attention is directed to the fact that the cylindrical-shaped rollers provide long parallel bearings for the journal, retaining the latter uniform on said bearings and causing it to revolve true in its position, with ease and reduced friction and without liability to groove or crease the journal. The advantages possessed by said journal are communicated to the cutting cylinder in that the latter runs uniform and without wabbling.

Having thus described my invention what I claim as new and desire to secure by Letters Patent, is:—

1. A plate having a boss thereon, one portion of said boss being interiorly of semi-cylindrical form, a loose segmental band in the opposite portion of said boss, a cage in said band and said first named portion of said boss, cylindrical shaped rollers freely occupying pockets in said cage, said cage being adapted to receive a journal, the latter having its bearing on said rollers, said first named portion of the boss having on one of its terminals an offset forming a seat on which the adjacent terminal of said band is adapted to be fulcrumed, and a controlling and adjusting device for said band, said device being fitted in said opposite portion of the boss and adapted to engage said band intermediate of its ends.

2. In a roller bearing for a journal, a side plate, a boss which is integral with said plate, a loose semi-cylindrical band in said boss, a portion of said boss being a stationary semi-cylindrical member, forming with said band said bearing, a cage in said bearing, cylindrical shaped rollers freely occupying pockets in said cage, portions of the peripheries of said rollers being within and without the periphery of said cage, said cage directly receiving said journal, and said rollers contacting with the latter throughout their lengths parallel with said journal, and a resilient sleeve encircling said cage interposed between said rollers and the members of the roller bearings.

3. In a roller bearing for a journal, a side plate, a boss thereon partly cylindrical on the interior thereof, a loose circular band in said boss forming a continuity of said portion comprising the bearing for said journal, offsets on the terminals of said portion, one terminal of said band being fulcrumed on the adjacent offset, an adjusting screw member in the other offset adapted to engage the adjacent terminal of said band, and an adjusting screw member in said boss opposed to said first named screw member in its engagement with said band.

4. A plate, a boss thereon, the upper portion of the latter being comparatively of semi-cylindrical form, a loose segmental band in the lower portion of said boss, a cage in said band and upper portion of the boss, cylindrical shaped rollers freely occupying pockets in said cage, said cage being adapted to receive a journal with which said rollers contact, a screw fitted in the lower portion of said boss adapted to bear upwardly against said band, and a screw fitted in the upper portion of said boss adapted to bear downwardly against said band.

5. A plate, a boss thereon, the upper portion of the latter being comparatively of semi-cylindrical form, a loose segmental band in the lower portion of said boss, a cage in said band and upper portion of the boss, cylindrical shaped rollers freely occupying pockets in said cage, said cage being adapted to receive a journal with which said rollers contact, a screw fitted in the lower portion of said boss adapted to bear upwardly against said band, a screw fitted in the upper portion of said boss adapted to bear downwardly against said band, and a shoulder on an extremity of said band, said boss having said shoulder fulcrumed in the inner side of its upper portion.

WALTER E. GRAHAM.

Witnesses:
N. F. CRESSMAN,
JAS. L. CHRISMAN.